Oct. 14, 1941.   E. A. RING   2,259,082
COATED TEMPLE BOW
Filed July 11, 1940
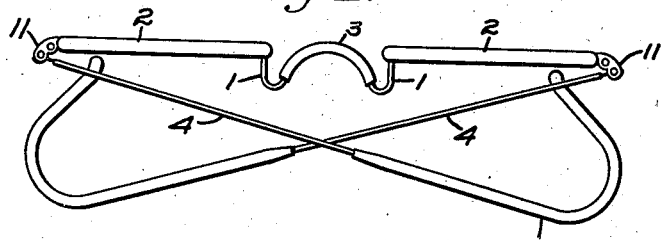
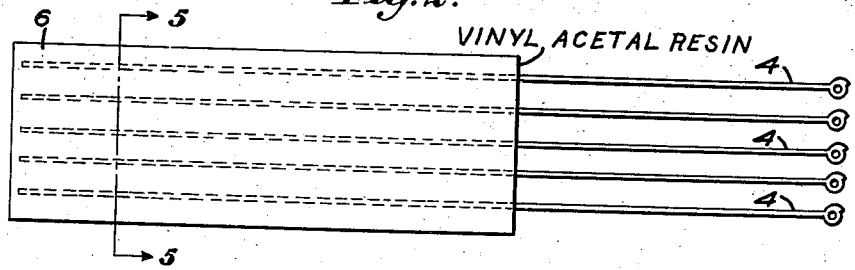
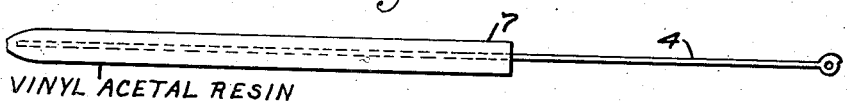
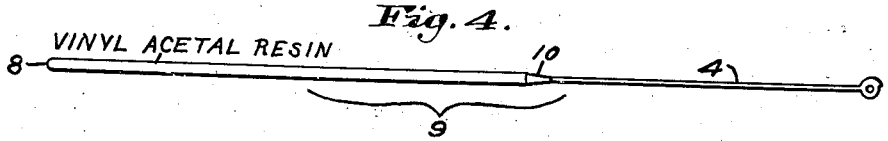
Inventor:
Ernest A. Ring, Patented Oct. 14, 1941

2,259,082

UNITED STATES PATENT OFFICE 2,259,082

COATED TEMPLE BOW

Ernest A. Ring, Providence, R. I., assignor of one-half to Francis M. Blakeney, East Providence, R. I.

Application July 11, 1940, Serial No. 344,865

5 Claims. (Cl. 88—52)

This invention relates to temple bows coated with vinyl acetal resin.

In order that the principle of the invention may be readily understood, I have disclosed in the accompanying drawing a temple for spectacle bows covered in accordance with my invention with vinyl acetal resin compacted and compressed thereabout.

In said drawing:

Fig. 1 is a plan view of a pair of spectacles, the temples whereof have been covered with vinyl acetal resin and completed in accordance with my invention;

Fig. 2 is a plan view of a series of temples placed in parallel position between laminations of such resinous material, for subsequent separation as individually coated temples;

Fig. 3 is a plan view of one of the temples after the members of the series thereof shown in Fig. 2 have been separated from each other by a lengthwise cutting operation midway between the temples;

Fig. 4 is a view of the temple completed excepting for the bending into the shape shown in Fig. 1; and Fig. 5 is a cross section through the series of covered temples shown in Fig. 2.

I will first state concisely in somewhat tabular or synopsized form the features of the article of my invention, before describing the structure shown in the drawing in detail, and I will at a subsequent point herein set forth the reasons for the use by me, in the practice of my invention, of vinyl acetal resin, the advantages secured therefrom by me in so doing, and the novel result obtained.

In the practice of my invention laminations or sheets of vinyl acetal resin are provided; the temple, or preferably a plurality thereof are laid side by side in closely spaced relation upon one or more of said sheets; said temples are then overlaid with one or more other laminations of the said vinyl acetal resin; and all the laminations of the said vinyl acetal resin are compressed and compacted against said temples; the compressed structure is then cut into strips between the several temples so as to provide strips substantially square or rectangular in cross section; then each temple is bent into the form for use, and, desirably after bending, each pair of temples is attached to the spectacle bow.

It has long been sought to provide suitable covering for temples of spectacles, but so far as I am aware no entirely satisfactory substance has heretofore been found or used for this purpose. In some cases rubber has been used. The contact of rubber directly with the skin of the wearer has long been known to be objectionable, and various other materials have been tried, to overlay the rubber and thus to prevent direct contact thereof with the skin of the wearer. There has been a long standing problem in the wear of spectacles, the proper solution of which has never heretofore been arrived at so far as I am aware. The problem in question includes that of resting or supporting a pair of spectacles in such manner and with the use of such material as to allow the wearer maximum comfort and efficiency, and yet at the same time preventing the direct contact with the skin of the wearer of any substance that may injuriously affect the skin.

Where rubber has been used, it has been customary from time to time to remove the rubber material and to substitute a fresh rubber piece therefor. This, however, involves a substantial expense if the user wishes to secure efficiency in use and the best appearance of the device. Physicians are practically agreed that continued direct contact with rubber is unhealthy for tender skin.

Owing to the objections in one way or another to all substances heretofore used or the use of which I have experimented with and tested, I have conducted painstaking investigations to obtain a wholly satisfactory substance with the result that with a certain material hereinafter more definitely described, I have developed or discovered unexpected qualities or capacities of the material and have found that by using such material, I have provided a temple which constitutes its own cushion and does not need an underlying cushioning material of rubber or anything else. In other words, the material is self-cushioning. The material also responds to the body heat or temperature of the skin of the wearer in that it adapts itself to the shape of the temple portions of the forehead with which it comes in contact.

The foregoing and other qualities which I have ascertained as unexpected advantages and unexpected features of adaptability of the substance, render the same what I believe to be a skin-contacting portion of temples for which I and other manufacturers of spectacles have long sought, and heretofore in vain.

The substance found to be wholly satisfactory as employed by me may be briefly described as a resinous product resulting from the polymerization of certain vinyl compounds. More precisely stated, I employ a plastic composition obtainable by polymerizing compounds containing the vinyl (CH$_2$:CH) or substituted vinyl radicals and defined generally as polyvinyl resins; for example, polyvinyl halides, a co-polymer obtained from vinyl acetate and vinyl chloride, the polyvinyl esters, and vinylidene halide polymers, the polyvinyl acetals, the polyacrylates, polymethacrylates, and copolymers of vinyl chloride and acrylates, and polystyrene.

I have obtained the best results in the manufacture of coverings for temples with polyvinyl acetal resins. These vary in the proportion of the degree of hydrolysis of the ester and the degree of combination of the aldehyde. I obtain a very highly satisfactory polyvinyl acetal resin by hydrolizing a polyvinyl acetate and reacting with formaldehyde so that the final resin is made substantially of 82% acetal, 8% hydroxyl groups, calculated as polyvinyl alcohol, and 10% acetate by weight. Another very highly satisfactory plastic compound of the polyvinyl resinous nature is produced by hydrolyzing a polyvinyl acetate and reacting with butyraldehyde, so that the final resinous substance may be considered to be made of substantially 2% or less of acetate, 16 to 20% hydroxyl groups calculated as polyvinyl alcohol and the balance acetal. Both of the foregoing substances I suitably plasticize in order to adapt them to my purpose, as will be set forth hereinafter.

I may also employ polyvinyl acetals made with other aldehydes, as, for example, acetaldehyde propionaldehyde, valeraldehyde and the like, or mixtures of aldehydes may be used. More briefly stated, I employ a vinyl resin and more specifically the vinyl acetals of the so-called "Butvar" type.

A vinyl resin of the Butvar type may be briefly defined as a partial polyvinyl acetal employing butyraldehyde as the acetalization medium. Other polyvinyl acetals may vary in the extent of hydroxyl groups, the residual ester groups and the acetal groups present in the vinyl composition.

As herein fully set forth, the polyvinyl acetal resinous coating material employed by me and which is directly applied as a self-cushioning plastic material to the basal element is, because of its herein defined composition, inherently responsive to the body heat at the place of use and is strongly resistant to any deterioration therefrom, and it inherently adapts itself to and retains the shape at such portion of the head at the area of the place of use thereof, and because of its defined composition it is non-sticky in use. Other advantages thereof are herein set forth.

Having referred in detail to certain plastic substances which I have found to possess unexpected qualities peculiarly adapting them to use as covering for temples of spectacles that come in direct contact with the skin, I shall proceed to describe the preferred embodiment of my invention without, however, limiting my invention to the things herein described.

In Fig. 1, I have represented a pair of spectacles, the frame or bow whereof is shown at 1, and the glass elements at 2. The nose piece is indicated at 3. These parts may be of any usual or preferred construction. The nose piece 3 is formed with or suitably attached to the frame 1, and suitable temples 4 are attached in any suitable way at 11.

In order to cover and prepare temples in accordance with my invention, I have, after a great deal of experimentation selected and employed vinyl acetal resin, and I preferably use the same in sheets or laminations, some positioned below and some above a series of the temples, which are positioned in sufficiently spaced parallel relation over the underlying sheets or laminations of said resinous material. I apply at a suitable stage a solvent which softens the resinous material sufficiently to make a bond, so that all the layers become homogeneous, but it must be and is of such character as not to deteriorate the resinous material. It is to be understood that the solvent employed has rendered the resinous material satisfactorily plastic and that the several laminations become or will become bonded together and entirely homogeneous. Preferably, the covered temple is then dipped into a solvent such as Monsanto No. 45 dip, which is a mixture of one or more ketones and one or more esters, thereby obtaining a very clear, brilliant finish and transparency. It is to be understood that instead of applying the resinous material as laminations, and pressing said laminations, I may individually mold the said vinyl acetal resin about each temple. Of course, if a series of temples are placed together in the mold side by side in suitably spaced relation, they are separated afterward by a cutting operation as hereinbefore referred to.

I am, of course, aware that vinyl resins have been employed in certain processes, but I believe I am the first to employ such material in such a way, or to adapt it to such use, that the said resinous material contacts in use with the skin when the article to which it is applied is in its intended use. Being the first so far as I am aware to make such use thereof, I have, in making said use, ascertained that the resinous material has unexpected qualities adapting it to the said use as a skin-contacting substance. Among the said unexpected qualities which I have discovered or developed are that (1) the substance is self-cushioning and does not need any cushioning member thereunder such as rubber, (2) the said resinous material by reason of coming into contact with the skin of the user of the spectacles is rendered more pliable and thus actually conforms to the shape or contour of the sides of the forehead at the areas of contact, (3) the oils or exudations of the skin are found to remove the stickiness present in the resinous material. In other words, I found in my experiments or trial tests, in the use and adaptation to my purpose of vinyl acetal resin, that a stickiness, which I found to be natural to the said substance, had been removed and did not again exhibit itself. I carefully studied this unexpected development or phenomenon, and I came to the conclusion that such disappearance of the stickiness is or may be due to the action of oils or exudations of the skin, particularly in the presence of human bodily heat.

I have discovered that not only does the solvent employed by me render the resinous material or resinous material composition suitably plastic so that it makes a bond of the several laminations of the resinous material, but that in its said plastic condition it suitably adheres to the metal basal member, particularly when the same has been given a suitable liquid dip to aid in the binding of the resinous material thereto, and, even more important, the solvent, in the presence of heat and pressure, thoroughly clears up the resinous material and makes it transparent.

Instead of applying the described resinous material by a molding operation, I may apply the same by a dipping operation.

Referring now more particularly to the drawing, and merely as an example, I have in Fig. 2 represented the simultaneous covering of five temples 4 as a set. The temples are of any suitable metallic or non-metallic material, but are preferably metal, such as gold, silver, etc. In the art, the temple is referred to as a "metal cable temple."

Upon a suitable support, I place one or more laminations 5 of vinyl acetal resin, so that the complete set may be about .015" thick, though my invention is not so limited, having preferably soaked the said material in a suitable solvent. I then place the temples 4 in suitable spaced relation upon the said laminations, and thereover I place an equal number of laminations 6. This is indicated in Fig. 5. I then apply very strong pressure to the mass, which pressure is desirably continued for several hours, and forces out all air from between or even in the laminations so that no air is imprisoned in the completed article.

After a suitable pressing interval, I remove the pressed material with the series of temples embedded therein and then, by a suitable cutting device, such as a knife or a rotary cutter, I cut the mass between each two next adjacent temples, thus obtaining structures each consisting of a single temple 4 with the pressed coating indicated at 7 in Fig. 3. The outer end of the applied resinous covering may be tapered or rounded as indicated at 8 in Fig. 4.

The covered temple shown in Fig. 3, of course, has much excess covering material thereon, and therefore I remove the excess which is mainly at the sides, but may be throughout. I do this in any suitable way and produce the completed, but unbent temple shown at 9 in Fig. 4. The covered temple has a true cylindrical formation.

Desirably, the covered temple has the inner end of the covering 7 removed, so as to permit a beveled or tapered shape, as indicated at 10 in Fig. 4.

Each pair of temples 4 is then bent into the proper form, such as that diagrammatically indicated in Fig. 1 or other desired form, and the said temples are secured to the bow 1 at the usual places 11. Of course, the bending of the temples may be done at any desired stage.

If desired, the entire temple may be covered as herein described. My invention is not limited in this respect.

Having thus described the article of my invention, it is to be understood that although specific terms are employed, they are used in a generic and descriptive sense and not for purposes of limitation, the scope of the invention being set forth in the following claims.

I claim:

1. A temple for spectacle bows composed of a rod or strip-like, slender, metallic, very flexible core and an applied, tightly adherent, covering very flexible in its applied position as a unit with said core and extending throughout at least a prolonged continuous portion of the said core, said covering being composed of polyvinyl acetal resinous material applied to said core and very tightly compressed and compacted about said core and constituting, as so applied, compressed and compacted, a self-cushioning plastic material, said covering of polyvinyl acetal resin being, because of its said composition, inherently responsive to the body heat at the place of use, so as to adapt itself to the shape of the wearer's head formation at the area of use and being strongly resistant to deterioration from such contact in use, and because of its said composition being non-sticky in use.

2. A temple for spectacle bows composed of a rod or strip-like, slender, metallic, very flexible core and an applied, tightly adherent covering very flexible in its applied position as a unit with said core and extending throughout at least a prolonged continuous portion of the said core, said covering being composed of polyvinyl acetal resinous material obtained by hydrolizing a polyvinyl acetate and reacting with formaldehyde applied to said core and compressed and compacted about said core and constituting, as so applied, compressed and compacted, a self-cushioning plastic material, said covering being, because of its said composition, inherently responsive to the body heat at the place of use whereby the covering adapts itself to the shape of the wearer's head formation at the area of use, and strongly resistant to deterioration therefrom, and because of its said composition being non-sticky in use.

3. A temple for spectacle bows composed of a very flexible rod or strip-like core having applied and tightly adherent thereto throughout at least a prolonged continuous portion of the said core, a covering of polyvinyl resinous material produced by hydrolizing a polyvinyl acetate and reacting with butyraldehyde, and consisting of substantially 2% of acetate, substantially 16 to 20% hydroxyl groups calculated as polyvinyl alcohol and the balance acetal, said covering being rendered plastic for such application, and being compressed and compacted about said core and being in its applied position very flexible as a unit with said core, and having a polished outer surface, the said covering consisting of a plurality of laminations of the said plastic material all bonded into a homogeneous whole.

4. A temple for spectacle bows composed of a rod or strip-like, slender, metallic, very flexible core and an applied, tightly adherent, covering very flexible in its applied position as a unit with said core and extending throughout at least a prolonged continuous portion of the said core, said covering being composed of polyvinyl acetal resinous material applied to said core and very tightly compressed and compacted about said core and constituting, as so applied, compressed and compacted, a self-cushioning plastic material, which material is very markedly self-cushioning in comparison with commercial zylonite and Celluloid, and which is devoid of the generally recognized objections to rubber as a skin-contacting substance, said covering of polyvinyl acetal resin being, because of its said composition, inherently responsive to the body heat at the place of use whereby the covering adapts itself to the shape of the wearer's head formation at the area of use, and strongly resistant to deterioration from such bodily contact in use, and because of its said composition being non-sticky in use.

5. A covered temple devoid of any imprisoned air and intended for spectacle bows, composed of a rod or strip-like, slender, metallic, very flexible core, and an applied, tightly and permanently adherent covering consisting of a series of very thin laminations made up of respectively underlying and overlying laminations all very tightly compressed and compacted about said core, to effect exclusion of air, said laminated covering being very flexible in its applied position as a unit with said core and extending throughout at least a prolonged continuous portion of said core, said laminated covering being composed of polyvinyl acetal resin and constituting, as so applied, compressed and compacted, a self-cushioning plastic covering which is very markedly self-cushioning in comparison with commercial zylonite and Celluoid, and which is, because of its said composition, devoid of the generally recognized objection to rubber as a skin-contacting substance, said covering being, because of its said composition, inherently responsive to the body heat at the place of use so as to adapt itself to the shape of the wearer's head formation at the area of use, and strongly resistant to deterioration from such bodily contact, and being non-sticky in use, as an applied temple core covering.

ERNEST A. RING.